United States Patent [19]

Scalzo

[11] 4,439,645
[45] Mar. 27, 1984

[54] SOUND ATTENUATING EARCUP ASSEMBLY WITH OUTSIDE COMMUNICATION CAPABILITY

[75] Inventor: John P. Scalzo, Carbondale, Pa.

[73] Assignee: Gentex Corporation, Carbondale, Pa.

[21] Appl. No.: 362,508

[22] Filed: Mar. 26, 1982

Related U.S. Application Data

[63] Continuation of Ser. No. 150,159, May 15, 1980, abandoned, which is a continuation-in-part of Ser. No. 106,909, Dec. 26, 1979, abandoned.

[51] Int. Cl.³ .......................... H04M 1/19; H04R 1/10
[52] U.S. Cl. ............................. 179/156 R; 179/156 A; 381/94
[58] Field of Search .............. 179/156 R, 156 A, 1 P, 179/2 BC, 182 A, 183, 107 R, 107 E

[56] References Cited

U.S. PATENT DOCUMENTS

| | | | |
|---|---|---|---|
| 3,683,130 | 8/1972 | Kahn | 179/1 P |
| 3,952,158 | 4/1976 | Kyle et al. | 179/1P |
| 4,060,701 | 11/1977 | Epley | 179/156 R |
| 4,064,362 | 12/1977 | Williams | 179/1 P |
| 4,087,653 | 5/1978 | Frieder, Jr. et al. | 179/156 R |

FOREIGN PATENT DOCUMENTS

| | | | |
|---|---|---|---|
| 2659673 | 7/1978 | Fed. Rep. of Germany | 179/2 BC |
| 1289993 | 9/1972 | United Kingdom | 179/156 R |
| 1378294 | 12/1974 | United Kingdom | 179/1 P |

*Primary Examiner*—Gerald L. Brigance
*Attorney, Agent, or Firm*—Shenier & O'Connor

[57] ABSTRACT

A sound attenuating earcup assembly having ambient communication capability without the necessity of removing the assembly in which a cup or shell adapted to fit over the wearer's ear is made of a relatively hard sound attenuating material and is formed with three wall openings each extending from the outer surface of the shell to the interior and each of which is provided with an external countersink. The first opening receives the battery casing having an externally removable cover which holds the casing onto the shell with its terminals located within the shell. The second opening receives the outside communication unit with the microphone facing outwardly and the major portion of the unit and its terminals retained inside the shell by a detachable fastener. The switch actuating element extends outwardly through the third opening from the body of the switch carrying the switch terminals. A protective sleeve screwed onto a portion of the switch post to hold the switch in position surrounds the actuator to reduce the possibility of accidental actuation. The earphone is disposed in a recess in a pad of sound absorbing material in the shell. Where the assemblies are used in pairs for a binaural effect only one assembly is provided with a switch. Means is provided for connecting the earcup carried elements to external electronics so as to charge said battery from a power source in said external electronics.

2 Claims, 7 Drawing Figures

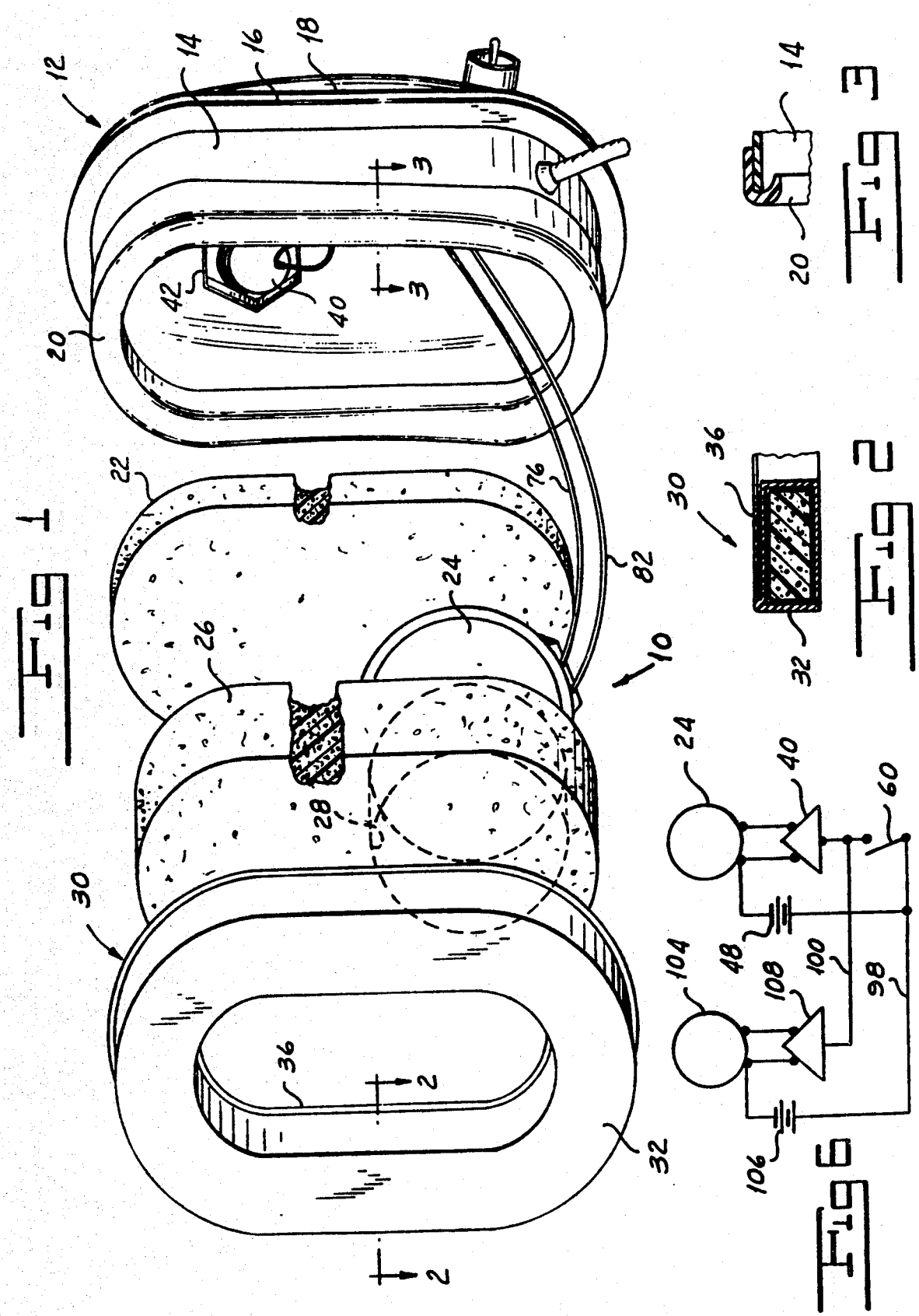

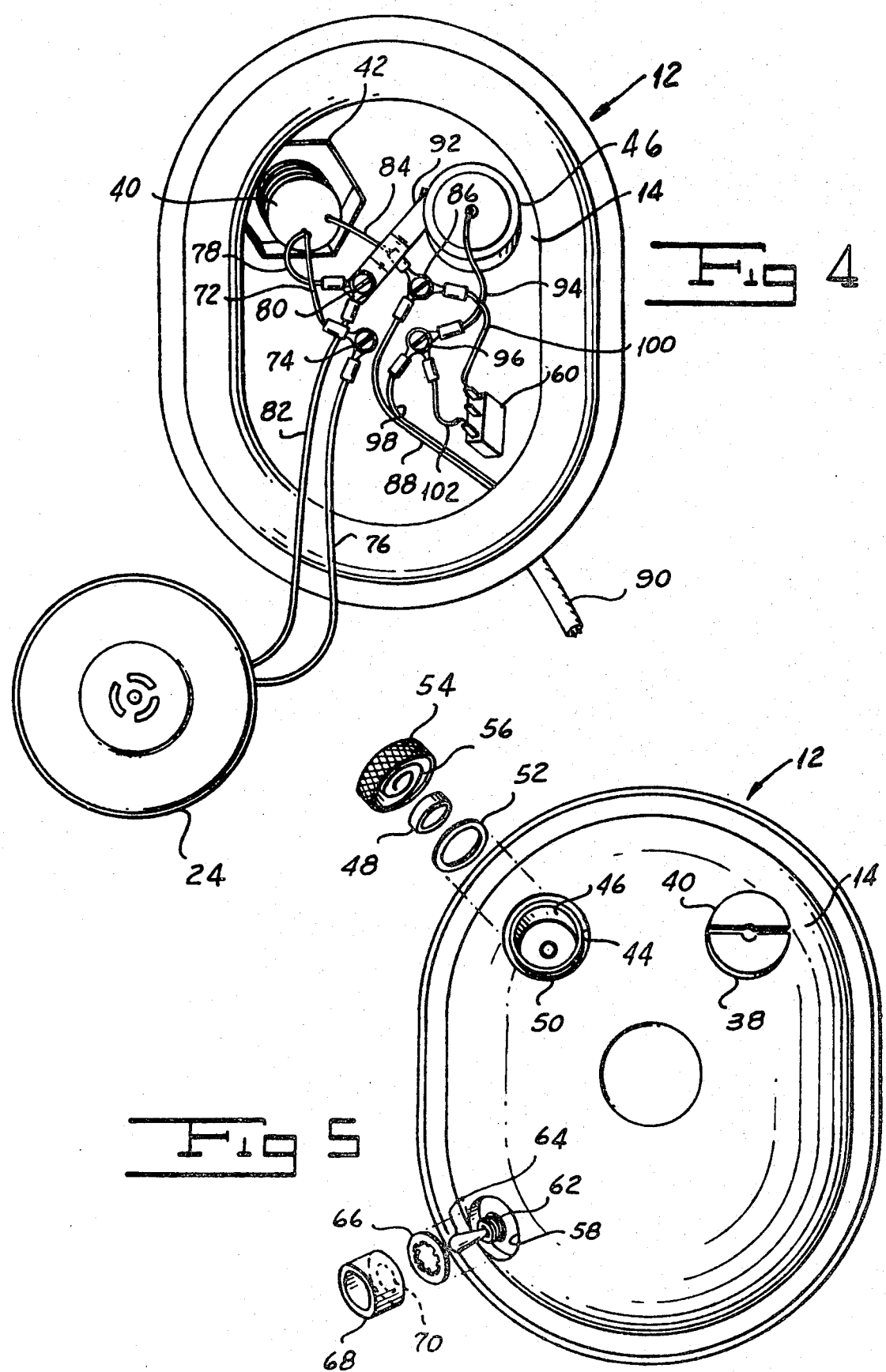

SOUND ATTENUATING EARCUP ASSEMBLY WITH OUTSIDE COMMUNICATION CAPABILITY

CROSS REFERENCE TO RELATED APPLICATION

This application is a continuation of application Ser. No. 150,159, filed May 15, 1980, which application was a continuation-in-part of my copending application Ser. No. 106,909, filed Dec. 26, 1979, both now abandoned.

FIELD OF THE INVENTION

The invention relates to the field of sound attenuating earcup assemblies and, more particularly, to an improved sound attenuating earcup assembly having outside communication capability.

BACKGROUND OF THE INVENTION

There are known in the prior art various forms of sound attenuating earcup assemblies which are designed to protect the wearer's hearing against damage as a result of ambient noise. One of the difficulties which has been encountered with such assemblies is that they do not permit of a direct outside communication with persons in the surrounding area without removing the protective earcup assemblies from the wearer's head. Attempts have been made in the prior art to solve this problem.

Wood U.S. Pat. No. 3,306,911 represents one attempt to solve the problem outlined above. This patent shows a protective earcup assembly in which an external shell made from metal, fiberglass or plastic, or the like, has a peripheral cushion seal for engaging the wearer's head and a liner formed from a sound absorbing material such, for example, as foamed plastic. A miniature speaker is embedded in the liner. A mounting bracket on the outside of the rigid cup carries a housing for the amplifier, which housing supports a microphone and a combination on/off and volume control switch. This housing which is of generally rectangular configuration extends an appreciable distance outwardly of the outer surface of the earcup. A door is provided for access to the interior of the housing for replacement of the battery. An electrical lead extends through the cup and its liner to the receiver.

While the arrangement shown in the Wood patent apparently successfully achieves the functional result of permitting a person wearing a protective earcup to communicate with persons in the surrounding area without the necessity of removing the earcup, structurally it leaves much to be desired. First, it is extremely bulky for the result achieved thereby. The housing extends outwardly of the cup for such an extent that it is likely to come into contact with surrounding objects as the wearer moves his head, particularly in relatively close quarters. It requires the electrical lead to be passed through the hard outer shell in some undisclosed manner. The arrangement does not permit of the ready replacement of various components of the system.

SUMMARY OF THE INVENTION

One object of my invention is to provide a sound attenuating earcup assembly which as outside communication capability.

Another object of my invention is to provide a sound attenuating earcup assembly having outside communication capability in which potential damage to any of the components of the assembly is minimized.

A further object of my invention is to provide a sound attenuating earcup assembly having outside communication capability in which replacement of any of the components of the system is greatly facilitated.

A still further object of my invention is to provide a sound attenuating earcup assembly having outside communication capability in which the battery of the outside communication system is adapted to be recharged from the source of potential of an external electronics system when the earcup carried elements are connected to an external communication system.

Other and further objects of my invention will appear from the following description.

In general my invention contemplates the provision of a sound attenuating earcup assembly including a cup formed of a relatively hard sound attenuating material, the wall of which is provided with three openings extending from the outer surface thereof to the interior thereof. The first of these three openings receives the battery casing in which the battery is releasably held by an externally removable cover which permits replacement of the battery. The second of the three openings receives the outside communication assembly with the microphone facing outwardly and with the major portion of the component disposed within the cup and with the assembly releasably held in operative relationship on the cup. The switch actuating element of my assembly extends outwardly through the third opening at a convenient location on the cup with the body of the switch disposed inside the cup guard which protects the element against accidental actuation and also serves to hold the switch element in position. The earphone of the assembly is disposed in a recess in one of a pair of pads of soft sound absorbing material inserted into the cup over the readily releasable terminal connections of the leads of the various components.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 1 is an exploded perspective view of one of my improved earcup assemblies having outside communication capabilities with parts shown in section.

FIG. 2 is a fragmentary sectional view of one of the components of the assembly shown in FIG. 1 taken along the line 2—2 thereof.

FIG. 3 is a fragmentary sectional view of another component of the assembly shown in FIG. 1 taken along the line 3—3 thereof.

FIG. 4 is a plan view from the inside of my improved sound attenuating earcup assembly having outside communication capability with parts removed.

FIG. 5 is a partially exploded outside plan view of my improved sound attenuating earcup assembly having outside communication capability.

FIG. 6 is a schematic view of the electrical circuitry of my improved sound attenuating earcup assembly having outside communication capability.

FIG. 7 is a schematic view of the electrical circuitry of my improved sound attenuating earcup assembly having outside communication capability in use with the external electronics of an external communication system.

DESCRIPTION OF THE PREFERRED EMBODIMENT

Referring now to FIGS. 1 to 3 of the drawings, the right-hand sound attenuating earcup assembly indicated generally by the reference character 10 of my system includes a hard outer earcup indicated generally by the reference character 12, the body 14 of which is molded from a suitable synthetic resin so as to be formed with a pair of spaced peripheral flanges 16 and 18 forming a channel adapted to receive the material surrounding an earcup assembly opening in a flexible helmet flap, such for example in the manner shown in Aileo U.S. Pat. No. 4,023,209.

A contoured edge piece 20 molded from the same material as is the body 14 is secured over the inner edge of the body 14 by any suitable means, such for example as by an epoxy resin or the like. A first pad 22 of foamed resin or the like is adapted to be inserted into the body 14 over internal electrical elements to be described hereinbelow with an earphone 24 disposed over the pad 22. A second pad 26 adapted to be inserted into the cup 12 over the pad 22 is formed with a recess 28 for receiving the earphone 24. It will readily be appreciated that the inner pad 22 rather than the outer pad 26 could be formed with the receiver recess. The assembly is completed by a cushion 30 made up of a cover 32 which receives a body 34 of soft foamed synthetic resin. A peripheral flange 36 which is integral with the cover 32 is adapted to be stretched over the peripheral member 20, so as to hold the pad 30 in position on the assembly.

Referring now to FIGS. 4 and 5 of the drawings, I form the wall of the body 14 from the outside thereof with a first countersunk opening 38, which is adapted to receive the outside communication assembly package which includes, for example, a microphone facing outwardly of the cup and an amplifier. It will be seen that the assembly 40 is generally cylindrical in configuration and is provided with external threads adapted to receive a sheet metal nut 42 which releasably holds the assembly 40 in the opening 38. It will further be seen that the assembly 40 does not extend any appreciable distance outwardly from the outer surface of the body 14.

I form the wall of the body 14 from the outside thereof with a second countersunk opening 44, which receives a battery case 46 for housing the battery 48. The outside of the case wall is provided with threads 50. After the battery 48 has been inserted into the case 46 an O-ring 52 is inserted into the countersink and a cap 54 is screwed onto the threads 50 to cause a spring 56 to urge the battery into engagement with a terminal in the base of the housing 46.

I form the wall of the body 14 with a third countersunk opening 58. A toggle switch housing 60 disposed in the interior of the cup 12 carries a cylindrical threaded post 62 which extends outwardly through the bore 58. The actuating arm 64 of the toggle switch assembly extends outwardly of the cylindrical threaded post 62. After placing a lock washer 66 in the countersink of the opening 58, I assemble a guard 68 in the countersink by screwing a threaded opening 70 in the bottom of the guard 68 over the threaded post 62.

From the structure just described, it will readily be apparent from each of the three main components, the outside communication assembly 40, the battery housing 50 and the switch 60 and its guard 68 are all readily and removably assembled on the cup 12. I provide my assembly with means for readily releasably electrically connecting all of the components of the system. For example, a first lead 72 of the outside communication assembly extends to a terminal 74 which may be a conductive screw threaded into the wall of the body 14. The second lead 78 of the outside communication assembly 40 extends to a conductive screw 80 forming a terminal, which screw is threaded into the body 14. The third lead 84 of the outside communication assembly extends to a terminal 86 which is, for example, a screw threaded into the wall of the body 14. A first lead 88 of a cord 90 which connects the right and left earcup assemblies is secured to terminal 86. The first lead 92 from the battery casing 50 may, for example, be a strip of conductive material soldered to the outside of the casing leads to terminal 80. The second central lead 94 from the battery assembly extends to a terminal 96, which may be a conductive screw threaded into the wall of the body 14. Terminal 96 also receives the other lead 98 of the connecting cord 90. The first lead 100 from the switch 60 extends to terminal 86, while the second lead 102 of the switch is connected to terminal 98.

Referring now to FIG. 6, a left-hand cup assembly of a complete system includes a left-hand earphone 104, battery 106 and an outside communication assembly 108. It will readily be seen that the left-hand and right-hand systems are interconnected by leads 98 and 100. Moreover, it will readily be apparent that only one of the two assemblies need be provided with a switch 60.

It will readily be appreciated that in many instances my sound attenuating earcup assembly will make up a part of a complete communication system providing intercommunication capability as well as radio communication. Referring now to FIG. 7 like parts to those shown in FIG. 6 have been indicated by the same reference characters and as being part of the individual-carried electronics indicated schematically by the block 110. Rather than individual batteries 48 and 106 as shown in FIG. 6, I have shown a common battery 112 for the outside communication system. The arrangement illustrated in FIG. 7 includes a microphone 114, which may be either a contact microphone or a boom-supported microphone carried by a helmet or the like (not shown) with which the communication system is used. Respective ganged switch arms 118 and 120 are adapted to be moved selectively into engagement with upper contacts 122 and 124 and into engagement with a pair of lower contacts 126 and 128. The individual-carried electronic assembly 110 is adapted to be coupled to an external electronics system 130 by means of a multiple contact plug indicated generally by the reference character 132 adapted to be received in a multiple contact receptacle indicated generally by the reference character 134.

In operation of the arrangement of FIG. 7 in providing outside communication with plug 132 disconnected from receptacle 134 switch 60 is closed and the system operates as in FIG. 6. With plug 132 in operative engagement with receptacle 134 arms 118 and 120 may be moved into engagement with contacts 122 and 124 to connect the individual electronics to the intercommunication system. Alternatively, with the switch arms 118 and 120 in engagement with contacts 126 and 128 the individual's electronics are connected to the radio system.

With plug 132 engaged with receptacle 134 the +6 v. source of the system 130 provide power for the microphone amplifier 116. I connect a resistor 136 of a suitable magnitude such, for example, as 2100 ohms between the +6 v. terminal of amplifier 116 and the positive terminal of battery 112. In this way battery 112 is being recharged during the time the individual electronics is connected to the external electronic system.

In use of my improved sound attenuating earcup assembly having outside communication capability, under the conditions of high ambient sound for which the system is intended, the user will be wearing both left and right earcup assemblies and the toggle switch 106 will be open, so that the outside communication system is disabled. When the conditions of high ambient sound do not exist and the wearer wishes to communicate with persons in the immediate area, he closes switch 60 so that he hears ambient sounds without the necessity of removing the earcup assemblies. Owing to the fact that each of the earcup assemblies is provided with an outside communication assembly, a binaural effect is provided.

From the description hereinabove, it will further be readily appreciated that the guard 68 protects the actuator 64 against accidental actuation. The construction and arrangement of my assemby is such that any of the various components can readily be removed and replaced.

It will be seen that I have accomplished the objects of my invention. I have provided a sound attenuating earcup assembly which has outside communication capability. My assembly is rugged. The components thereof are readily assembled and as readily disassembled for replacement. The amplifier battery of my system is automatically recharged when the system is connected to an external electronics system.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention what I claim is:

1. In a sound attenuating earcup and local ambient communication assembly powered by a battery and adapted to permit the earcup wearer to hear local sounds without removing said earcup when in a first use independently of an external electronic communication system having a power supply and adapted to a second use in conjunction with said external electronic communication system upon interengagement of electrical connectors leading respectively to said local ambient communication system and to said external electronic communication system, the improvement comprising an electrical connection between said battery and said power supply upon engagement of said connectors to charge said battery in the second use of said assembly.

2. The improvement as in claim 1 in which said electronic communication system comprises a microphone assembly carried by the wearer and having a terminal connected to said power supply upon engagement of said electrical connectors and in which said electrical connection comprises a resistor connected between said battery and said terminal.

* * * * *